(12) United States Patent
Cai et al.

(10) Patent No.: US 9,384,782 B2
(45) Date of Patent: Jul. 5, 2016

(54) RECORD FILE EDITING METHOD AND SYSTEM

(71) Applicant: SHENZHEN UNIVERSITY, Shenzhen (CN)

(72) Inventors: Shumin Cai, Shenzhen (CN); Zhuolin Yang, Shenzhen (CN); Jianyong Chen, Shenzhen (CN); Dan Xiao, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 14/432,411

(22) PCT Filed: Apr. 2, 2014

(86) PCT No.: PCT/CN2014/074629
§ 371 (c)(1),
(2) Date: Mar. 30, 2015

(87) PCT Pub. No.: WO2014/161489
PCT Pub. Date: Oct. 9, 2014

(65) Prior Publication Data
US 2015/0279423 A1    Oct. 1, 2015

(30) Foreign Application Priority Data

Apr. 3, 2013  (CN) .......................... 2013 1 0115624

(51) Int. Cl.
| | | |
|---|---|---|
| *G06F 17/00* | (2006.01) | |
| *G11B 27/036* | (2006.01) | |
| *G11B 27/10* | (2006.01) | |
| *G11B 27/031* | (2006.01) | |
| *G11B 27/28* | (2006.01) | |
| *G11B 27/034* | (2006.01) | |

(52) U.S. Cl.
CPC ............ *G11B 27/036* (2013.01); *G11B 27/031* (2013.01); *G11B 27/034* (2013.01); *G11B 27/10* (2013.01); *G11B 27/28* (2013.01)

(58) Field of Classification Search
CPC ......... G06F 3/0656; G06F 3/16; G06F 3/162; G06F 3/165; G06F 3/167; G11B 27/10; G11B 27/036; G11B 27/034; G11B 27/031; G11B 27/28
See application file for complete search history.

(56) References Cited

U.S. PATENT DOCUMENTS

| 6,182,200 B1 | 1/2001 | Duvall et al. |
| 6,532,513 B1 * | 3/2003 | Yamamoto ............ G06F 3/0613 711/100 |

(Continued)

FOREIGN PATENT DOCUMENTS

| CN | 101227602 | 7/2008 |
| CN | 103247317 | 8/2013 |
| EP | 1014371 | 6/2000 |

*Primary Examiner* — Andrew C Flanders
(74) *Attorney, Agent, or Firm* — Hamre, Schumann, Mueller & Larson, P.C.

(57) ABSTRACT

The present invention is applicable to the field of multimedia technologies and provides a record file editing method and system, where the method includes: performing fragmentation on an audio file to acquire multiple audio fragments; performing fragment cutting on the multiple acquired audio fragments; storing a fragment time period, a quantity of audio fragments, a fragment cutting time point, and an audio fragment number in a preset record file of the fragment cutting time point; reading each fragment cutting time point from the record file of the fragment cutting time point, performing time mapping on the fragment cutting time point, and storing, in an array, a new fragment cutting time point that is obtained after the mapping; and reading a prestored interaction mapping file between a document and audio, and performing an adjustment on a time point in the interaction mapping file between a document and audio according to the new fragment cutting time point. According to the present invention, a problem that inconsecutive edited document files and audio are not synchronized during playback can be effectively resolved.

10 Claims, 9 Drawing Sheets

(56) References Cited

U.S. PATENT DOCUMENTS 7,062,442 B2 * 6/2006 Berg .................. G10L 25/78
704/270

2007/0162568 A1 * 7/2007 Gupta ................ G06Q 30/0242
709/219
2014/0025710 A1 * 1/2014 Sarto .................. G06F 17/3002
707/823

* cited by examiner

```
<recording>
    <metadata meeting_id="d75a37c7ae891b1fe98fb7659a84bd2ad7755c59-1354869921945"
    <outrecord block="0" start="0" stop="0" block_length="300"/>
    <outrecord block="1" start="0" stop="0" block_length="300"/>
    <outrecord block="2" start="0" stop="0" block_length="300"/>
    <outrecord block="3" start="0" stop="0" block_length="300"/>
    <outrecord block="4" start="0" stop="0" block_length="300"/>
    <outrecord block="5" start="0" stop="0" block_length="300"/>
    <outrecord block="6" start="0" stop="0" block_length="300"/>
    <outrecord block="7" start="0" stop="0" block_length="300"/>
    <outrecord block="8" start="0" stop="0" block_length="300"/>
    <outrecord block="9" start="0" stop="0" block_length="300"/>
    <outrecord block="10" start="0" stop="0" block_length="300"/>
    <outrecord block="11" start="0" stop="0" block_length="300"/>
    <outrecord block="12" start="0" stop="0" block_length="300"/>
    <outrecord block="13" start="0" stop="0" block_length="300"/>
    <outrecord block="14" start="0" stop="0" block_length="300"/>
    <outrecord block="15" start="0" stop="0" block_length="300"/>
    <outrecord block="16" start="0" stop="0" block_length="300"/>
    <outrecord block="17" start="0" stop="0" block_length="300"/>
    <outrecord block="18" start="0" stop="0" block_length="300"/>
    <outrecord block="19" start="0" stop="0" block_length="300"/>
    <outrecord block="20" start="0" stop="0" block_length="300"/>
    <outrecord block="21" start="0" stop="0" block_length="300"/>
    <outrecord block="22" start="0" stop="0" block_length="73"/>
</recording>
```

FIG. 3

```
<recording>
    <metadata meeting_id="d75a37c7ae891b1fe98fb7659a84bd2ad7755c59-1
    <outrecord block="0" start="0" stop="0" block_length="300"/>
    <outrecord block="0" start="60" stop="70" block_length="290"/>
    <outrecord block="0" start="60" stop="70" block_length="280"/>
    <outrecord block="0" start="70" stop="80" block_length="270"/>
    <outrecord block="1" start="0" stop="0" block_length="300"/>
    <outrecord block="1" start="60" stop="70" block_length="290"/>
    <outrecord block="1" start="120" stop="140" block_length="270"/>
    <outrecord block="2" start="0" stop="0" block_length="300"/>
    <outrecord block="3" start="0" stop="0" block_length="300"/>
    <outrecord block="4" start="0" stop="0" block_length="300"/>
    <outrecord block="5" start="0" stop="0" block_length="300"/>
    <outrecord block="6" start="0" stop="0" block_length="300"/>
    <outrecord block="7" start="0" stop="0" block_length="300"/>
```

RECORD FILE EDITING METHOD AND SYSTEM

TECHNICAL FIELD

The present invention pertains to the field of multimedia technologies, and in particular, relates to a record file editing method and system.

BACKGROUND

Figure 1A:
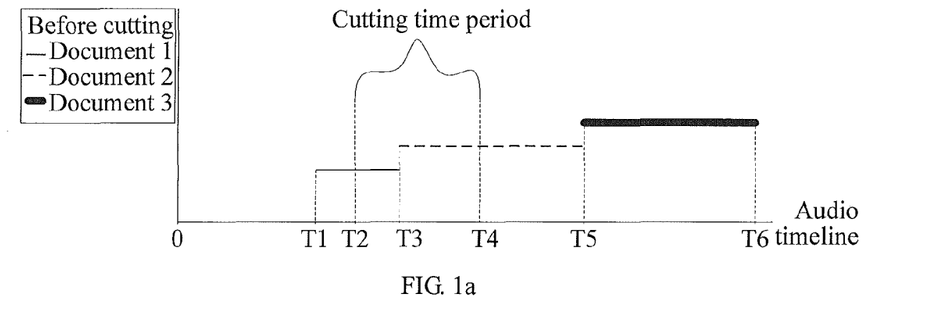
FIG. 1a and FIG. 1b in FIG. 1 are schematic diagrams of an existing record file editing method.
Figure 1B:
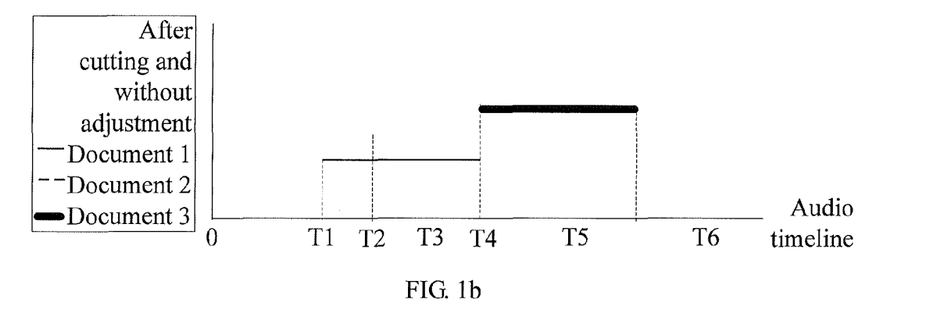

In the prior art, when a file is recorded, starting from appearance time points, multiple uploaded inconsecutive document files are loaded and file paths and names are recorded, and when a document file is played, only a flipping page number of the file is recorded. Therefore, when editing is performed on the recorded file according to editing time periods shown in FIG. 1a, after audio is edited, a document file corresponding to an end point no longer exists, resulting in that inconsecutive edited document files and the audio are not synchronized during playback, as shown in FIG. 1b.

SUMMARY

An embodiment of the present invention provides a record file editing method to resolve a problem in the prior art that inconsecutive edited document files and audio are not synchronized during playback.

This embodiment of the present invention is implemented as follow: a record file editing method, where the method includes:

performing fragmentation on an audio file to acquire multiple audio fragments, and recording a fragment time period and a quantity of audio fragments;

performing fragment cutting on the multiple acquired audio fragments, and recording a fragment cutting time point and a corresponding audio fragment number;

storing the recorded fragment time period, quantity of audio fragments, fragment cutting time point and corresponding audio fragment number in a preset record file of the fragment cutting time point;

reading each fragment cutting time point from the record file of the fragment cutting time point, performing time mapping on the fragment cutting time point, and storing, in an array, a new fragment cutting time point that is obtained after the mapping; and reading a prestored interaction mapping file between a document and audio, and performing an adjustment on a time point in the interaction mapping file between a document and audio according to the new fragment cutting time point.

An embodiment of the present invention further provides a record file editing system, where the system includes:

a fragmenting unit, configured to perform fragmentation on an audio file to acquire multiple audio fragments, and record a fragment time period and a quantity of audio fragments;

a fragment cutting unit, configured to perform fragment cutting on the multiple acquired audio fragments, and record a fragment cutting time point and a corresponding audio fragment number;

a storage unit, configured to store the recorded fragment time period, quantity of audio fragments, fragment cutting time point and corresponding audio fragment number in a preset record file of the fragment cutting time point;

a mapping unit, configured to read each fragment cutting time point from the record file of the fragment cutting time point, perform time mapping on the fragment cutting time point, and store, in an array, a new fragment cutting time point that is obtained after the mapping; and an adjusting unit, configured to read a prestored interaction mapping file between a document and audio, and perform an adjustment on a time point in the interaction mapping file between a document and audio according to the new fragment cutting time point.

Compared with the prior art, embodiments of the present invention have the following beneficial effects: According to the embodiments of the present invention, by fragmenting, cutting, and combining an audio file, after time periods for multiple times of cutting of current audio are recorded and fragment cutting time points of audio fragments are mapped to time points of the audio file, a time adjustment is performed, so that when the edited audio and inconsecutive documents are continuously played, time mapping keeps consistent, thereby effectively resolving a problem that inconsecutive edited document files and audio are not synchronized during playback. In addition, because the audio file is cut after fragmentation is performed, editing efficiency can be greatly improved.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 3 is a schematic diagram of an audio file fragment according to Embodiment 1 of the present invention;

FIG. 4 is a schematic diagram of fragment cutting according to Embodiment 1 of the present invention;

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

In order to describe the technical solutions of the present invention, the following uses specific embodiments for description.

Embodiment 1

Figure 2:
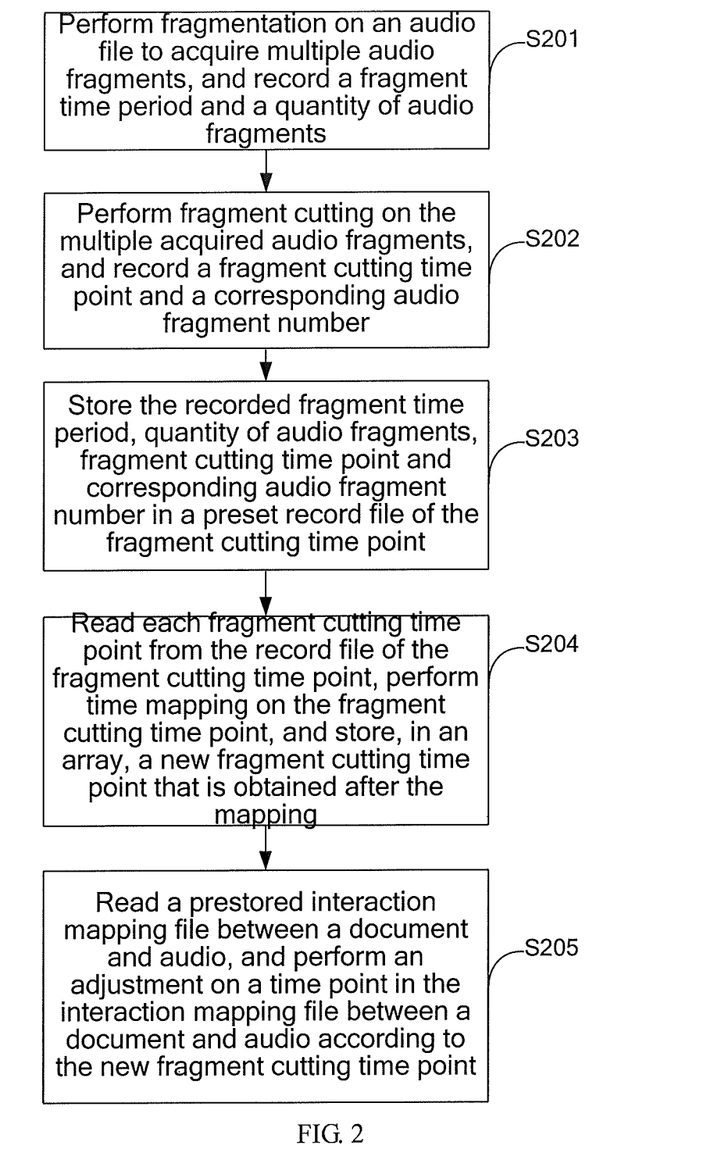
FIG. 2 is an implementation flowchart of a record file editing method according to Embodiment 1 of the present invention.

FIG. 2 shows an implementation procedure of a record file editing method according to Embodiment 1 of the present invention, where a process of the method is described in detail as follows:

In step S201, fragmentation is performed on an audio file to acquire multiple audio fragments, and a fragment time period and a quantity of audio fragments are recorded.

In this embodiment, the fragmentation refers to performing of fragment cutting on the audio file by using same time as a unit. As shown in FIG. 3, a length of the audio file is 6673 seconds, a quantity of audio fragments after the fragmentation is 23, serial numbers of the audio fragments range from 0 to 22 (herein, a fragment and a block indicate a same concept, which are unified as the fragment), each fragment of first 0-21 fragments is 300 seconds, and a last fragment has only 73 seconds.

In step S202, fragment cutting is performed on the multiple acquired audio fragments, and a fragment cutting time point and a corresponding audio fragment number are recorded.

In this embodiment, the fragment cutting refers to performing of any multiple times of cutting on any audio fragment. The fragment cutting time point includes a fragment cutting start time point and a fragment cutting end time point.

Exemplarily, as shown in FIG. 4, when a first fragment (that is, a block serial number (audio fragment number) is 0) is chosen, the fragment is cut for three times:

First time: A length of the audio fragment is 5 minutes, a cutting time period is 60 seconds-70 seconds, and a total time of 10 seconds is cut;

Second time: The length of the audio fragment is 4 minutes and 50 seconds, a cutting time period is 60 seconds-70 seconds, and a total time of 10 seconds is cut; and Third time: The length of the audio fragment is 4 minutes and 40 seconds, a cutting time period is 70 seconds-80 seconds, and a total time of 10 seconds is cut.

Then, a second fragment (that is, a block serial number is 1) is chosen, which is cut for two times:

First time: A length of the audio fragment is 5 minutes, a cutting time period is 60 seconds-70 seconds, and a total time of 10 seconds is cut; and Second time: The length of the audio fragment is 4 minutes and 50 seconds, a cutting time period is 120 seconds-140 seconds, and a total time of 20 seconds is cut.

In step S203, the recorded fragment time period, quantity of audio fragments, fragment cutting time point and corresponding audio fragment number are stored in a preset record file of the fragment cutting time point.

This embodiment further includes: performing combination on the audio fragments obtained after the fragment cutting.

Figure 5:
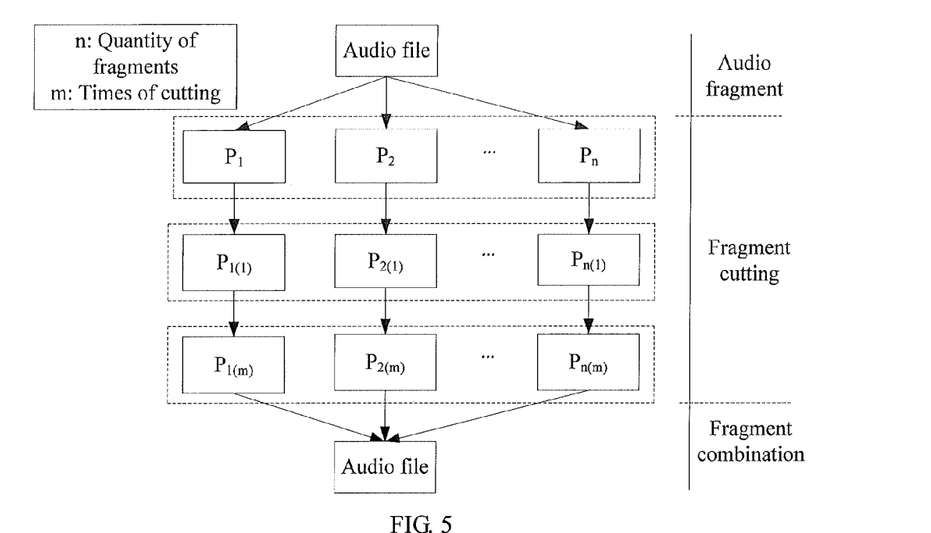
FIG. 5 is a schematic diagram of fragmentation, cutting, and combination of an audio file according to Embodiment 1 of the present invention.

As shown in FIG. 5, FIG. 5 includes a schematic diagram of fragmentation, cutting, and combination of an audio file, where n indicates a quantity of fragments, and m indicates cutting times.

In step S204, each fragment cutting time point is read from the record file of the fragment cutting time point, time mapping is performed on the fragment cutting time point, and a new fragment cutting time point that is obtained after the mapping is stored in an array.

Figure 6A:
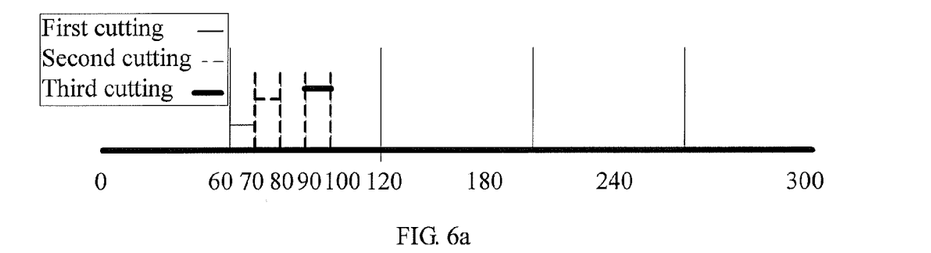
FIG. 6a and FIG. 6b in FIG. 6 are schematic diagrams of mapping according to Embodiment 1 of the present invention.
Figure 6B:
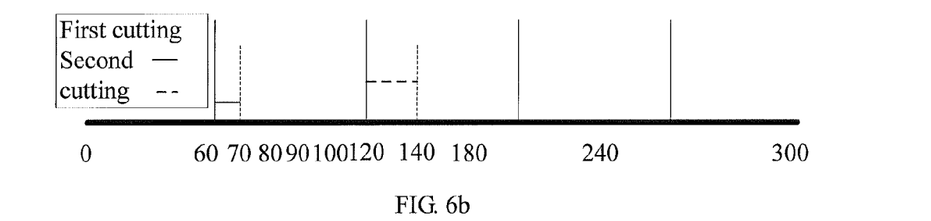

In this embodiment, the mapping specifically is as follows: All fragment cutting time points are mapped to corresponding cutting time points in the audio fragments, and then the corresponding cutting time points in the audio fragments are mapped to cutting time points of the whole audio file, and new fragment cutting points that are obtained after the mapping are stored in the array. With reference to FIG. 4, as shown in FIG. 6, FIG. 6a shows a schematic diagram of mapping the first fragment that is cut for three times to a first audio fragment; and FIG. 6b shows a schematic diagram of mapping the second fragment that is cut for two times to a second audio fragment.

In this embodiment, a whole mapping process is specifically described as follows:

Step 1: Read the record file of the fragment cutting time point from top to down by using a script.

Step 2: Perform mapping on multiple times of fragment cutting of each audio fragment, and map time points of the multiple times of fragment cutting to a corresponding audio fragment. For example, time points of three times of cutting of the fragment whose fragment number is 0 are mapped to the audio fragment whose fragment number is 0, as shown in FIG. 6a; likewise, time points of two times of cutting of the fragment whose fragment number is 1 are mapped to the audio fragment whose fragment number is 1, as shown in FIG. 6b. Mapping of each fragment is sequentially processed (that is, each row of record in the file is sequentially processed). For a mapping process of each fragment, refer to step 3, and after all records are processed, go to step 4.

Figure 7A:
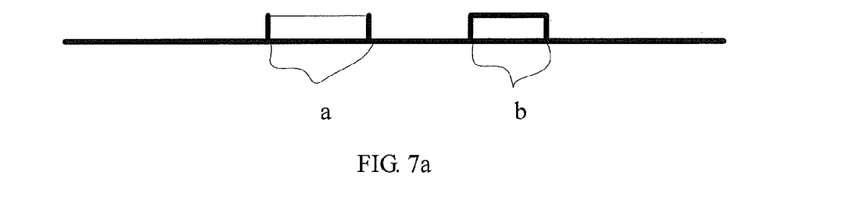
FIG. 7a, FIG. 7b, and FIG. 7c in FIG. 7 are schematic diagrams of comparison and mapping between cutting segments according to Embodiment 1 of the present invention.
Figure 7B:
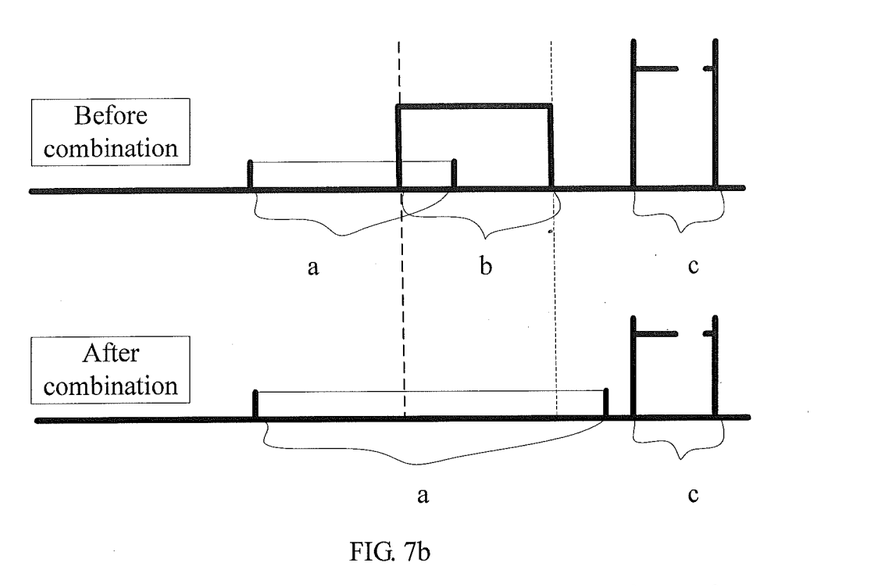
Figure 7C:
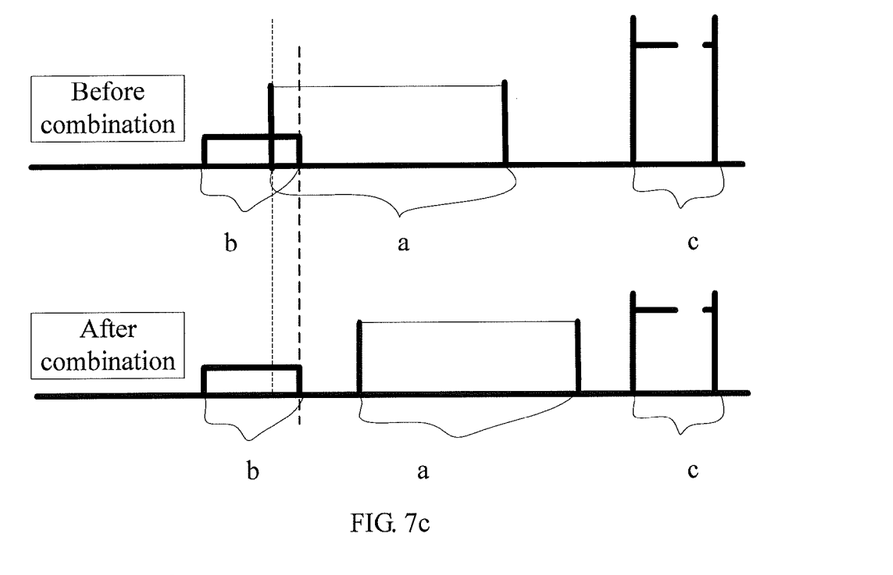

Step 3: Acquire a fragment cutting start time point and a fragment cutting end time point (corresponding to a row of record in the record file of the fragment cutting time point) from the record file of the fragment cutting time point; when a cutting segment a indicates first cutting of a fragment (that is, corresponding to a first row of cutting record of the fragment), save the cutting segment a (a start time point a.start and an end time point a.stop) in the array and go back to step 2; and when the cutting segment a indicates cutting other than the first cutting of the fragment, sequentially iterate and compare the cutting segment a with all previously saved cutting time periods, and then perform the mapping. A comparison and mapping process of the cutting segment a and a saved cutting time period b includes the following three cases: (1) When the fragment cutting start time point a.start and the fragment cutting end time point a.stop of the cutting segment a are both less than a fragment cutting start time point b.start of a saved cutting segment, the cutting segment a is saved before the cutting segment b, that is, in the array, the a.start and the a.stop are inserted before the b.start (as shown in FIG. 7a), and an iteration ends and go back to step 2; (2) When the b.start is in the middle of the start time point a.start and the end time point a.stop of the cutting segment, that is, the a and the b overlap, then the a and the b are combined into a new cutting segment a, as shown in FIG. 7b (a specific implementation manner is that the a.stop is changed into a.stop+a length of the cutting segment b, and the saved cutting segment b is deleted), and comparison mapping is continued to be performed on the new cutting segment a and a next saved cutting segment c, where a mapping process is the same as a comparison process of the a and the b; and if the next saved cutting segment c does not exist, the iteration ends and go back to step 2; (3) When the start time point a.start and the end time point a.stop of the cutting segment are both greater than the b.start, the time points of the cutting segment a are transformed, as shown in FIG. 7c (a specific implementation manner is that the a.start is changed into a.start+a length of the cutting segment b, and the a.stop is changed into a.stop+a length of the cutting segment b), and in this case, if the cutting segment b is a last saved cutting segment, go back to step 2, and otherwise, comparison mapping is continued to be performed on the new cutting segment and a next saved cutting segment c, where a mapping process is the same as a comparison process of the a and the b.

Step 4: After each audio fragment is mapped, map a cutting time period of each audio fragment to the whole audio file (a specific implementation manner is that each cutting time period is transformed according to the following formula: t=t+blockNum×300, where 300 indicates 5 minutes), and store, in the array, the new fragment cutting time point that is obtained after the mapping.

This embodiment also gives pseudocode of the mapping process, which is shown as follows:

Time mapping pseudocode of a time period for one cutting in a corresponding audio fragment is as follows:

An array pointArr is used to store a cutting time point of an audio fragment, pointArr [i] indicates a $(i+1)^{th}$ cutting time point in the audio fragment, start indicates a cutting start point, and stop indicates a cutting end time point.

```
Begin
for loop start time points of all cutting segments in the fragment,
  If start <pointArr [i] && stop <pointArr [i]
  start is inserted into the array pointArr as a first element and stop is inserted into the array pointArr as a second element
    break the for loop
  else if(start <=pointArr [i] && stop >=pointArr [i])
  stop=stop+time period for this cutting
  for loop determine whether stop exists in a next cutting segment
    stop=stop+next cutting time period
  end for
  pointArr [i]=start
  pointArr [i+1]=stop
  break the for loop
  else
  start=start+time period for this cutting
  stop=stop+time period for this cutting
  if i+1 is a last time point
  pointArr [i]=start
  pointArr [i+1]=stop
  break the for loop
  Else
  i=i+2 enter a start time point of a next cutting segment
  end
  end
end for
end begin.
```

In step S205, a prestored interaction mapping file between a document and audio is read, and an adjustment is performed on a time point in the interaction mapping file between a document and audio according to the new fragment cutting time point, where the interaction mapping file between a document and audio is also referred to as a document playback time point record file, and after system recording ends, the document playback time point record file is generated together with the record file and stored in the system.

In this embodiment, specific steps of adjusting the interaction mapping file between a document and audio are as follows:

Step 1: Use an array A to save to-be-cut time points corresponding to an audio file (unit is second).

For example, A[0]=5, A[1]=10, A[2]=15, A[3]=25, A[4]=315, and A[5]=400;

The array indicates that time periods for cutting the audio file are the following three cutting time periods: 5-10, 15-25, and 315-400.

Step 2: Use an array B to save a total time of the cutting time periods.

For example, B[0]=A[1]−A[0]=5
B[1]=A[3]−A[2]+B[0]=15
B[2]=A[5]−A[4]+B[1]=100

For the array B, summarize it as follows:
When i=0, B[0]=A[1]−A[0]
When i>0, B[i]=A[2×i+1]−A[2×i]+B [i−1]

Figure 8A:
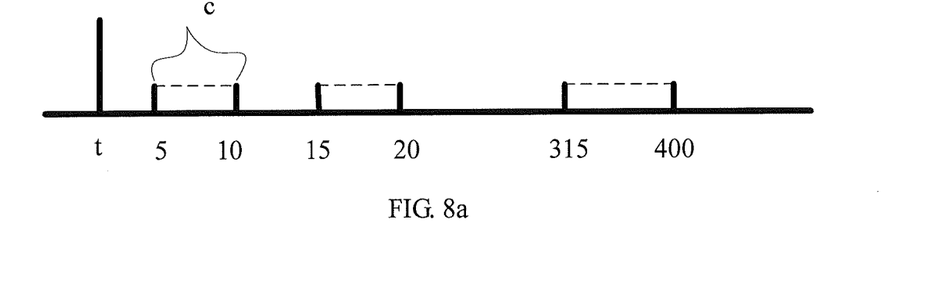
FIG. 8 is a schematic diagram of time adjusting according to Embodiment 1 of the present invention.
Figure 8B:
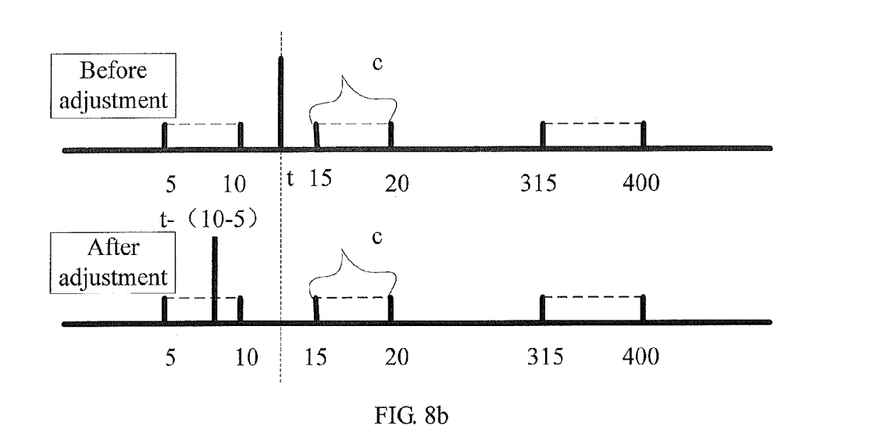
Figure 8C:
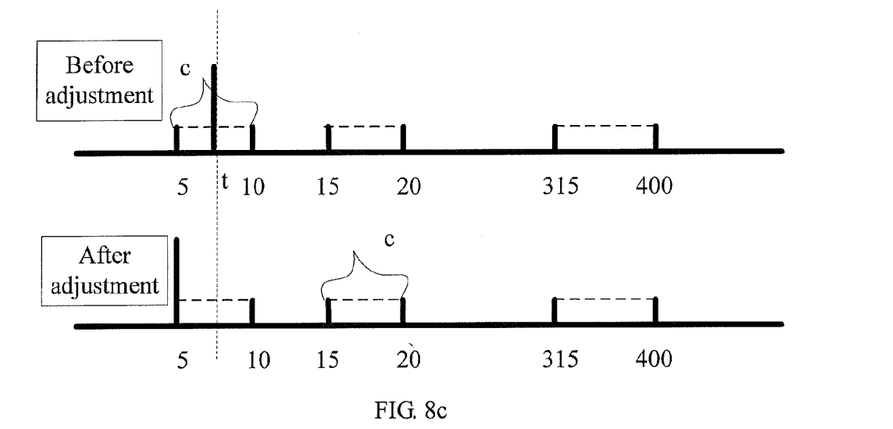
Figure 8D:
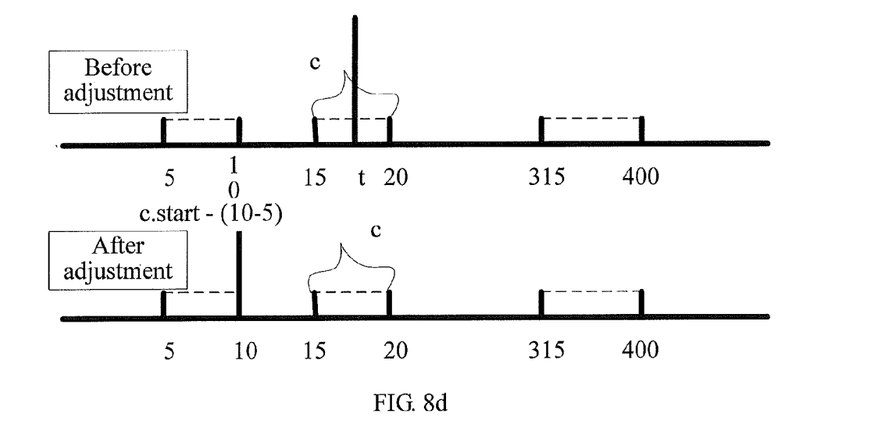
Figure 8E:
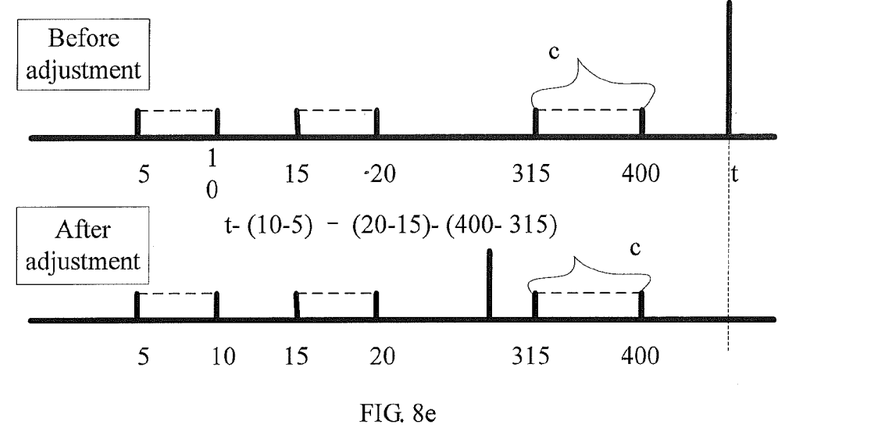
Figure 8F:
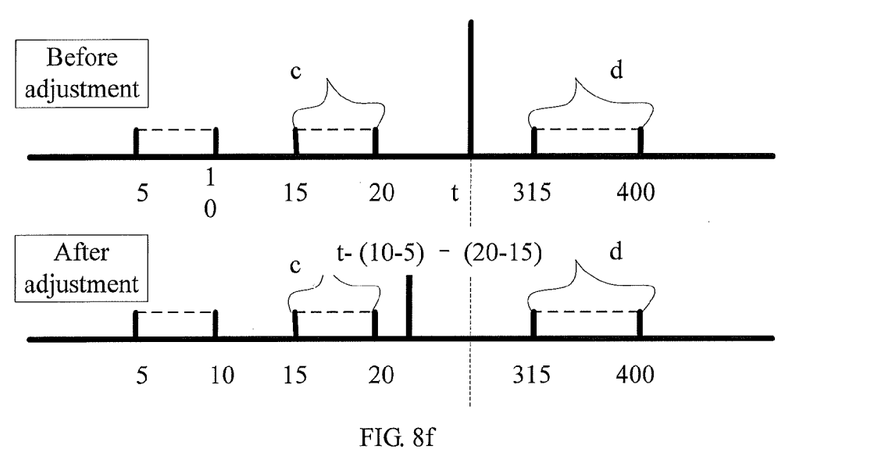
Figure 8G:
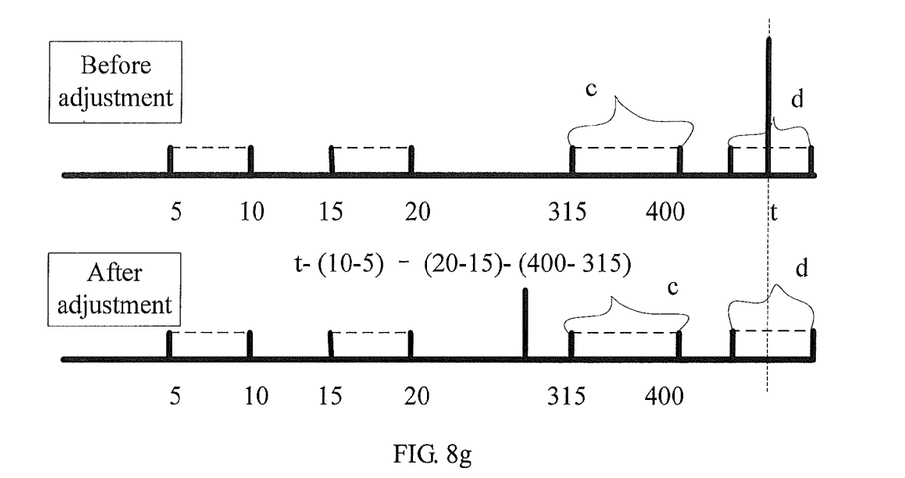

Step 3: Sequentially read each time point t from the interaction mapping file between a document and audio, for example, a dashed line shown in FIG. 8, the following adjusting manner is used to sequentially iterate each time point t with each cutting segment (that is, a time point saved in the array A), which is classified into the following three cases: (1): When the time point t is less than a start time point c.start of a cutting segment c, if the cutting segment c is a first cutting segment, time does not need to be adjusted, as shown in FIG. 8a; otherwise, an adjusting manner is t=t−total time of previous cutting time periods, as shown in FIG. 8b, and the iteration ends; (2): When the time point t falls within a time range of the cutting segment c, the t is adjusted in the following manner: when the cutting segment c is the first cutting segment, the t is adjusted to the start time point c.start of the first cutting segment, as shown in FIG. 8c; otherwise, the t is adjusted to the start time point c.start of the cutting segment−total time of all previous cutting time periods, as shown in FIG. 8d, and the iteration ends; (3): When the time point t is greater than an end time point of the cutting segment c, if a next cutting segment d does not exist (as shown in FIG. 8e) or the time point t is less than a start time point of a next cutting segment d (as shown in FIG. 8f), an adjusting manner is t=t−total time of previous cutting time periods, and the iteration ends, and if the next cutting segment d exists and the time point t is greater than the start time point d.start of the cutting segment d, as shown in FIG. 8g, the iteration continues.

This embodiment also gives pseudocode of the time adjusting process, which is shown as follows:

i (i is counted from 0) indicates a cutting segment, A[2×i] indicates a start time point of the cutting segment i, and A[2 i+1] indicates an end time point of the cutting segment i.

```
for loop the cutting segment i, and iterate from 0
  if t<A[2×i]
  if the cutting segment is not a first cutting segment
  t=t−B[i−1]
  break the loop
  else if t>=A[2×i]&& t<=A[2×i+1 ]
  if the cutting segment is a first cutting segment
  t=A[0]
  else
  t=A[2×i]−B[i−1]
  break the loop
  else if t>A[2×i+1]
  if a next cutting segment does not exist or a time point t is less than a start time point of a next cutting segment
  t=t−B[i]
  break the loop
  else
  iteration+1
  end
  end
  end.
```

Figure 9:
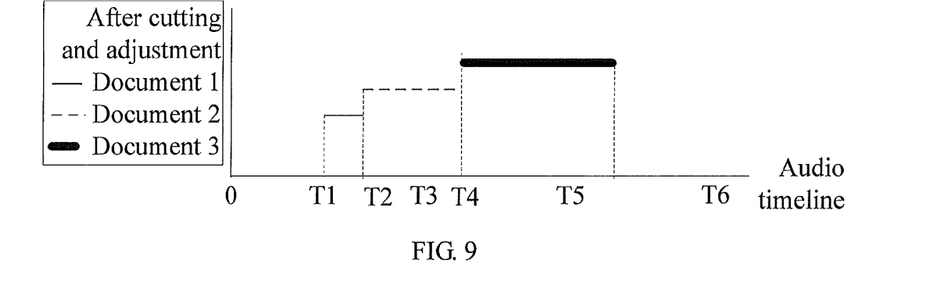
FIG. 9 is an effect diagram after time is adjusted according to Embodiment 1 of the present invention.

According to this embodiment of the present invention, by fragmenting, cutting, and combining an audio file, time periods for multiple times of cutting of current audio are recorded, fragment cutting time points of audio fragments are mapped to time points of the audio file, and a proper time adjustment is performed, so that when the edited audio and inconsecutive documents are played, time mapping keeps consistent (as shown in FIG. 9). In addition, because the audio file is cut after fragmentation is performed, editing efficiency can be greatly improved.

Embodiment 2

Figure 10:
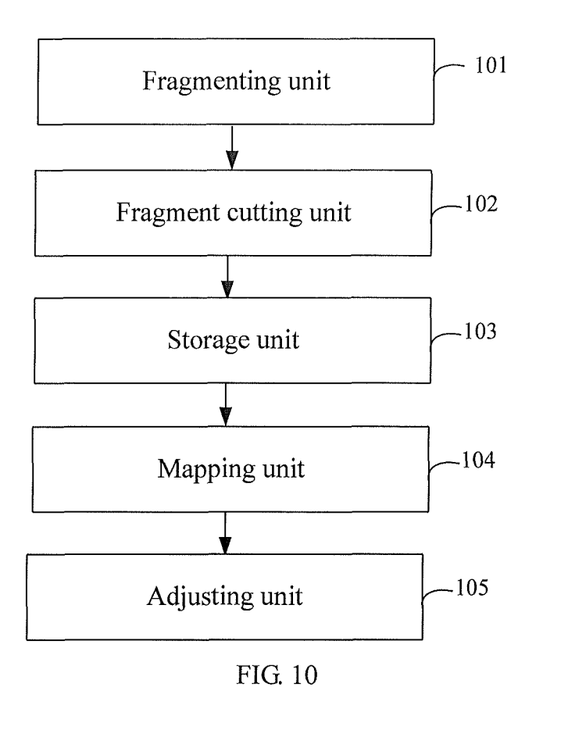
FIG. 10 is a compositional structure diagram of a record file editing system according to Embodiment 2 of the present invention.

FIG. 10 shows a compositional structure of a record file editing system according to Embodiment 2 of the present invention. For ease of description, only a part relevant to this embodiment of the present invention is shown.

The record file editing system may be a software unit, a hardware unit or a software and hardware combined unit that operate inside a terminal device.

The record file editing system includes a fragmenting unit 101, a fragment cutting unit 102, a storage unit 103, a mapping unit 104, and an adjusting unit 105, and specific functions thereof are as follows:

The fragmenting unit 101 is configured to perform fragmentation on an audio file to acquire multiple audio fragments, and record a fragment time period and a quantity of audio fragments;

the fragment cutting unit 102 is configured to perform fragment cutting on the multiple acquired audio fragments, and record a fragment cutting time point and a corresponding audio fragment number;

the storage unit 103 is configured to store the recorded fragment time period, quantity of audio fragments, fragment cutting time point and corresponding audio fragment number in a preset record file of the fragment cutting time point;

the mapping unit 104 is configured to read each fragment cutting time point from the record file of the fragment cutting time point, perform time mapping on the fragment cutting time point, and store, in an array, a new fragment cutting time point that is obtained after the mapping; and the adjusting unit 105 is configured to read a prestored interaction mapping file between a document and audio, and perform an adjustment on a time point in the interaction mapping file between a document and audio according to the new fragment cutting time point.

Further, the mapping unit 104 is specifically configured to:

read each group of data from the record file of the fragment cutting time point, map the read data to a fragment cutting time point of a corresponding audio fragment, and then map a fragment cutting time point of each audio fragment to the audio file, and store, in the array, the new fragment cutting time point that is obtained after the mapping.

Further, the mapping unit 104 is specifically configured to:

perform mapping on multiple times of fragment cutting of each audio fragment, and map a fragment cutting time point to a corresponding audio fragment;

read a fragment cutting start time point and a fragment cutting end time point from the record file of the fragment cutting time point; when a cutting segment indicates first cutting of the audio fragment, save a fragment cutting start time point and a fragment cutting end time point of the cutting segment in the array; and when the cutting segment indicates cutting other than the first cutting of the audio fragment, compare the fragment cutting start time point and the fragment cutting end time point of the cutting segment with a previously saved cutting time period, and then perform the mapping; and after each audio fragment is mapped, map a fragment cutting time period of each audio fragment to the audio file, and store, in the array, the new fragment cutting time point that is obtained after the mapping.

Further, the mapping unit 104 is specifically configured to:

when the fragment cutting start time point a.start and the fragment cutting end time point a.stop of the cutting segment are both less than a fragment cutting start time point b.start of a saved cutting segment, save the cutting segment a before the cutting segment b;

when the b.start is in the middle of the start time point a.start and the end time point a.stop of the cutting segment a, that is, the a and the b overlap, combine the cutting segment a and the cutting segment b into a new cutting segment, and continue to perform comparison mapping on the new cutting segment and a next saved cutting segment; and when the start time point a.start and the end time point a.stop of the cutting segment a are both greater than the b.start, transform the time points of the cutting segment a, and continue to perform comparison mapping on the transformed cutting segment and a next saved cutting segment.

Further, the adjusting unit 105 is specifically configured to:

sequentially read each time point t from the interaction mapping file between a document and audio, when the time point t is less than a start time point of a cutting segment, if the cutting segment is a first cutting segment, time does not need to be adjusted; otherwise, an adjusting manner is t=t−total time of previous cutting time periods;

when the time point t falls within a start time point and an end time point of a cutting segment, if the cutting segment is the first cutting segment, the t is adjusted to be a start time point of the first cutting segment; otherwise, t=start time point c.start of the cutting segment−total time of all previous cutting time periods; and when the time point t is greater than an end time point of a cutting segment, if a next cutting segment does not exist or the time point t is less than a start time point of a next cutting segment, t=t−total time of previous cutting time periods; and if the next cutting segment exists and the time point t is greater than the start time point of the next cutting segment, comparison is performed on the time point t with a cutting segment after the next cutting segment.

The record file editing system provided in this embodiment may use the foregoing corresponding record file editing method. For details, refer to relevant descriptions in Embodiment 1 of the foregoing record file editing method, and no repeated description is given here.

A person of ordinary skill in the art can understand that units included in the foregoing Embodiment 2 are divided only according to function logic. However, the division is not limited thereto so long as corresponding functions can be implemented. In addition, the specific name of each functional unit is only for convenience of differentiation and is not intended to limit the protection scope of the present invention.

In conclusion, according to the embodiments of the present invention, by fragmenting, cutting, and combining an audio file, time periods for multiple times of cutting of current audio are recorded, fragment cutting time points of audio fragments are mapped to time points of the audio file, and a proper time adjustment is performed, so that when the edited audio and inconsecutive documents are played, time mapping keeps consistent (as shown in FIG. 9). In addition, because the audio file is cut after being performed fragmentation, editing efficiency can be greatly improved, which has strong practicability.

A person of ordinary skill in the art may also understand that all or a part of the steps of the methods in the embodiments may be implemented by a program instructing relevant hardware. The program may be stored in a computer readable storage medium. The storage medium includes: a ROM/RAM, a magnetic disk, or an optical disc.

The foregoing content is further detailed descriptions of the present invention with reference to specific exemplary implementation manners, but it cannot be considered that specific implementation of the present invention is limited to only these descriptions. Several equivalent replacements or obvious variations with same performance or purposes made by a person of ordinary skill in the art to which the present invention belongs without departing from the conception of the present invention should be construed as falling within the patent protection scope that is of the present invention and determined by the submitted claims.

What is claimed is:

1. A record file editing method, wherein the method comprises:
   performing fragmentation on an audio file to acquire multiple audio fragments, and recording a fragment time period and a quantity of audio fragments;
   performing fragment cutting on the multiple acquired audio fragments, and recording a fragment cutting time point and a corresponding audio fragment number;
   storing the recorded fragment time period, quantity of audio fragments, fragment cutting time point and corresponding audio fragment number in a preset record file of the fragment cutting time point;
   reading each fragment cutting time point from the record file of the fragment cutting time point, performing time mapping on the fragment cutting time point, and storing, in an array, a new fragment cutting time point that is obtained after the mapping; and
   reading a prestored interaction mapping file between a document and audio, and performing an adjustment on a time point in the interaction mapping file between a document and audio according to the new fragment cutting time point.

2. The method according to claim 1, wherein the reading each fragment cutting time point from the record file of the fragment cutting time point, performing time mapping on the fragment cutting time point, and storing, in an array, a new fragment cutting time point that is obtained after the mapping specifically comprises:
   reading each group of data from the record file of the fragment cutting time point, mapping the read data to a fragment cutting time point of a corresponding audio fragment, and then mapping a fragment cutting time point of each audio fragment to the audio file, and storing, in the array, the new fragment cutting time point that is obtained after the mapping.

3. The method according to claim 1, wherein the reading each fragment cutting time point from the record file of the fragment cutting time point, performing time mapping on the fragment cutting time point, and storing, in an array, a new fragment cutting time point that is obtained after the mapping specifically comprises:
   performing mapping on multiple times of fragment cutting of each audio fragment, and mapping a fragment cutting time point to a corresponding audio fragment;
   reading a fragment cutting start time point and a fragment cutting end time point from the record file of the fragment cutting time point; when a cutting segment indicates first cutting of the audio fragment, saving a fragment cutting start time point and a fragment cutting end time point of the cutting segment in the array; and when the cutting segment indicates cutting other than the first cutting of the audio fragment, comparing the fragment cutting start time point and the fragment cutting end time point of the cutting segment with a previously saved cutting time period, and then performing the mapping; and
   after each audio fragment is mapped, mapping a fragment cutting time period of each audio fragment to the audio file, and storing, in the array, the new fragment cutting time point that is obtained after the mapping.

4. The method according to claim 3, wherein the comparing the fragment cutting start time point and the fragment cutting end time point of the cutting segment with a previously saved cutting time period specifically comprises:
   when the fragment cutting start time point a.start and the fragment cutting end time point a.stop of the cutting segment are both less than a fragment cutting start time point b.start of a saved cutting segment, saving the cutting segment a before the cutting segment b;
   when the b.start is in the middle of the start time point a.start and the end time point a.stop of the cutting segment a, that is, the a and the b overlap, combining the cutting segment a and the cutting segment b into a new cutting segment, and continuing to perform comparison mapping on the new cutting segment and a next saved cutting segment; and
   when the start time point a.start and the end time point a.stop of the cutting segment a are both greater than the b.start, transforming the time points of the cutting segment a, and continuing to perform comparison mapping on the transformed cutting segment and a next saved cutting segment.

5. The method according to claim 1, wherein the reading a prestored interaction mapping file between a document and audio, and performing an adjustment on a time point in the interaction mapping file between a document and audio according to the new fragment cutting time point specifically comprises:
   sequentially reading each time point t from the interaction mapping file between a document and audio, when the time point t is less than a start time point of a cutting segment, if the cutting segment is a first cutting segment, time does not need to be adjusted; if the cutting segment is not the first cutting segment, an adjusting manner is t=t−total time of previous cutting time periods;
   when the time point t falls within a start time point and an end time point of a cutting segment, if the cutting segment is the first cutting segment, the t is adjusted to be a start time point of the first cutting segment; if the cutting segment is not the first cutting segment, t=start time point c.start of the cutting segment−total time of all previous cutting time periods; and
   when the time point t is greater than an end time point of a cutting segment, if a next cutting segment does not exist or the time point t is less than a start time point of a next cutting segment, t=t−total time of previous cutting time periods;
   and if the next cutting segment exists and the time point t is greater than the start time point of the next cutting segment, comparison is performed on the time point t with a cutting segment after the next cutting segment.

6. A record file editing system, wherein the system comprises:
- a fragmenting unit, configured to perform fragmentation on an audio file to acquire multiple audio fragments, and record a fragment time period and a quantity of audio fragments;
- a fragment cutting unit, configured to perform fragment cutting on the multiple acquired audio fragments, and record a fragment cutting time point and a corresponding audio fragment number;
- a storage unit, configured to store the recorded fragment time period, quantity of audio fragments, fragment cutting time point and corresponding audio fragment number in a preset record file of the fragment cutting time point;
- a mapping unit, configured to read each fragment cutting time point from the record file of the fragment cutting time point, perform time mapping on the fragment cutting time point, and store, in an array, a new fragment cutting time point that is obtained after the mapping; and
- an adjusting unit, configured to read a prestored interaction mapping file between a document and audio, and perform an adjustment on a time point in the interaction mapping file between a document and audio according to the new fragment cutting time point.

7. The system according to claim 6, wherein the mapping unit is specifically configured to:
- read each group of data from the record file of the fragment cutting time point, map the read data to a fragment cutting time point of a corresponding audio fragment, and then map a fragment cutting time point of each audio fragment to the audio file, and store, in the array, the new fragment cutting time point that is obtained after the mapping.

8. The system according to claim 6, wherein the mapping unit is specifically configured to:
- perform mapping on multiple times of fragment cutting of each audio fragment, and map a fragment cutting time point to a corresponding audio fragment;
- read a fragment cutting start time point and a fragment cutting end time point from the record file of the fragment cutting time point; when a cutting segment indicates first cutting of the audio fragment, save a fragment cutting start time point and a fragment cutting end time point of the cutting segment in the array; and
- when the cutting segment indicates cutting other than the first cutting of the audio fragment, compare the fragment cutting start time point and the fragment cutting end time point of the cutting segment with a previously saved cutting time period, and then perform the mapping; and after each audio fragment is mapped, map a fragment cutting time period of each audio fragment to the audio file, and store, in the array, the new fragment cutting time point that is obtained after the mapping.

9. The system according to claim 8, wherein the mapping unit is specifically configured to:
- when the fragment cutting start time point a.start and the fragment cutting end time point a.stop of the cutting segment are both less than a fragment cutting start time point b.start of a saved cutting segment, save the cutting segment a before the cutting segment b;
- when the b.start is in the middle of the start time point a.start and the end time point a.stop of the cutting segment a, that is, the a and the b overlap, combine the cutting segment a and the cutting segment b into a new cutting segment, and continue to perform comparison mapping on the new cutting segment and a next saved cutting segment; and
- when the start time point a.start and the end time point a.stop of the cutting segment a are both greater than the b.start, transform the time points of the cutting segment a, and continue to perform comparison mapping on the transformed cutting segment and a next saved cutting segment.

10. The system according to claim 6, wherein the adjusting unit is specifically configured to:
- sequentially read each time point t from the interaction mapping file between a document and audio, when the time point t is less than a start time point of a cutting segment, if the cutting segment is a first cutting segment, time does not need to be adjusted; if the cutting segment is not the first cutting segment, an adjusting manner is t=t−total time of previous cutting time periods;
- when the time point t falls within a start time point and an end time point of a cutting segment, if the cutting segment is the first cutting segment, the t is adjusted to be a start time point of the first cutting segment; if the cutting segment is not the first cutting segment, t=start time point c.start of the cutting segment−total time of all previous cutting time periods; and
- when the time point t is greater than an end time point of a cutting segment, if a next cutting segment does not exist or the time point t is less than a start time point of a next cutting segment, t=t−total time of previous cutting time periods; and if the next cutting segment exists and the time point t is greater than the start time point of the next cutting segment, comparison is performed on the time point t with a cutting segment after the next cutting segment.

* * * * *